United States Patent [19]
Bouldin

[11] Patent Number: 6,012,663
[45] Date of Patent: Jan. 11, 2000

[54] MODULAR CUTTING SYSTEM AND TOOTH ASSEMBLY

[75] Inventor: Floyd E. Bouldin, Murfreesboro, Tenn.

[73] Assignee: Bouldin & Lawson, Inc., McMinnville, Tenn.

[21] Appl. No.: 09/261,534

[22] Filed: Mar. 3, 1999

Related U.S. Application Data

[63] Continuation-in-part of application No. 08/839,756, Apr. 15, 1997, Pat. No. 5,918,824.

[51] Int. Cl.$^7$ .................................................... B02C 17/20
[52] U.S. Cl. ..................................... 241/294; 241/101.761
[58] Field of Search .............................. 241/101.761, 244

[56] References Cited

U.S. PATENT DOCUMENTS

| | | | |
|---|---|---|---|
| 3,838,826 | 10/1974 | Wallace et, al. .......................... | 241/197 |
| 4,162,770 | 7/1979 | Lewis ........................................ | 241/191 |
| 4,958,775 | 9/1990 | Arasmith ................................. | 241/88.1 |
| 5,100,070 | 3/1992 | Montgomery, Sr. ..................... | 241/294 |
| 5,240,192 | 8/1993 | Tilby et al. ............................ | 241/292.1 |

*Primary Examiner*—Joseph J. Hail, III
*Assistant Examiner*—William Hong
*Attorney, Agent, or Firm*—Rick R. Wascher

[57] ABSTRACT

A direct drive material volume reduction apparatus having a frame, a motor supported by the frame, a drum supported by the frame and having an interior and an exterior, a drive shaft operably connected to the motor, a comminuting wheel assembly including a disk like body portion having an axis and a geared axle assembly operably interpositioned between and connected to the drive shaft and the comminuting wheel assembly to operably support the comminuting wheel assembly within the interior of the drum and to transmit the rotational torque of the motor imparted to the drive shaft and transfer it to the comminuter wheel assembly enabling the comminuter wheel to rotate within the interior of the drum. The geared axle assembly is preferably that of a motorized vehicle of the type found in an over-the-road type diesel truck. The drum may include a substantially cylindrical wall with an open first end and an open second end and a closure member to at least partially close the second end of the drum. The closure member may further comprise a grate, or a plurality of grate segments, mounted adjacent the second end of the drum. A hub supported by a distal end of an axle portion wherein the hub is configured to enable the comminuter wheel to be attached to it. At least one toothed bracket is secured to the wheel. A modular cutting system and tooth assembly including a holder portion and tooth element cooperatively configured for frictional interengagement such that the tooth element is rigidly attached to the holder during use and removable. The removable teeth are preferably formed of a unitary body construction wherein the unitary body is rigidly secured to the bracket and preferably also include a supplemental material contact portion.

17 Claims, 16 Drawing Sheets

MODULAR CUTTING SYSTEM AND TOOTH ASSEMBLY

RELATED APPLICATION DATA

This application is a continuation-in-part of previously filed U.S. patent application Ser. No. 08/839,756 filed Apr. 15, 1997 now U.S. Pat. No. 5,918,824.

BACKGROUND OF THE INVENTION

1. Field of the Invention

The present invention relates generally to machines and apparatuses having mechanical teeth or cutters used for grinding, comminuting, shredding, or otherwise reducing the volume of waste materials such as brush, tree limbs, lumber, stumps, logs, cement, cinder blocks, bricks, etc., and other discarded articles such as sofas, chairs, and mattresses to name a few. More particularly, the present invention relates modular tooth assemblies used in conjunction with the aforementioned machines and apparatuses where the modularity of such assemblies enables at least a portion of the individual teeth to be removable or replaceable.

2. Description of the Related Art

The art to which the invention relates is believed to include the modular tooth configurations used in conjunction with known apparatuses such as bale shredders, comminuters, tub grinders, rock crushers, etc., if the present invention can be used in conjunction with such apparatuses.

Until now, a tooth assembly having a fixed component and a removable component configured for a cooperative frictional interengagement of the type described herein has not been invented.

SUMMARY OF THE INVENTION

The preferred embodiment of the present invention includes a modular tooth assembly having a first stationary holder which is rigidly secured to, for example, the drum, disk or wheel or some intermediate device attached to the drum, disk, or wheel (hereinafter collectively and individually referred to simply as a "workpiece") used in conjunction with a material volume reduction apparatus such as, for example, a tub grinder, bale breaker or comminuting apparatus. The stationary holder preferably includes a pair of spaced apart leg portions which merge with and extend from a cross-member. The legs and cross-member form a channel bounded by the spaced apart legs, the underside of the cross-member, and in most cases the workpiece to which the holder is rigidly attached.

The channel may have a constant dimension or the channel dimension may change along its length. The change in the channel dimension is preferably the result of a change in the contour of the underside surface of the holder which is the holder surface opposite the workpiece onto which it is attached, the workpiece surface itself, or both.

The channel is preferably sized to receive at least a portion of a cooperating tooth element which is removable and replaceable when worn. The tooth element and holder are configured (i.e., shaped) to establish a cooperating friction fit between their structural surfaces. For example, the tooth element is installed into cooperating frictional engagement with the holder by inserting one of its arms into the aforedescribed channel and forcibly driving the tooth it into a seated position with a mallet or other tool. The fully seated position can be considered "optimum" if all or substantially all of the contacting surfaces of the holder and tooth mate and are congruently shaped. The seated position can be considered less than optimum when less than all of the contacting surfaces are congruent and mating even though the resultant, less than optimum, cooperating contact between the holder and tooth is acceptable for use of the inventive device. For example, if the channel dimension changes along its length then the arm which is received within the channel preferably includes a substantially similar change in configuration to accommodate the changes in the other cooperating component (i.e., the holder in this instance) in order to maintain what is believed to be the best congruent contact and thus the frictional fit therebetween.

While the optimum cooperating contact is preferred, manufacturing costs attributable to machine work tolerances could be prohibitive. Considering, however, the direction of the impact forces onto the tooth during use have a tendency to tighten the cooperating attachment between the holder and tooth rather than weaken it and thus this apparent deficiency is in reality quite slight or imperceptible. The preferred tooth also includes a material contact surface which forms the leading edge of the tooth and holder combination, and an insert in the form of a supplemental cutting element to minimize wear on the tooth body and present a relatively sharp cutting edge for a longer period of time.

The direction in which the tooth element is driven (i.e., installed with respect to the holder) corresponds to the rotation of the workpiece onto which the holder is attached, as well as the orientation of the holder if the underside surface of the cross-member varies the channel dimension such that the tooth is a "one-way" fit into the channel of the holder. It in the preferred embodiment, the tooth and holder allow a one way fit thereby preventing the service technician from installing the tooth in the wrong direction.

The preferred embodiment of the holder also includes an underside surface comprised of a planar region which is substantially parallel to the surface of the workpiece to which it is attached, as well as a beveled region extending from the planar region. Similarly, an arm of the preferred tooth is received by the channel of its holder and includes its own planar region and an angled region to cooperatively engage and congruently mate with the bevel of the underside surface of the holder. This congruent mating contact enhances the rigidity of the combination during use. As mentioned above, the direction of the impact forces onto the material contact surface of the removable tooth has a tendency to further tighten the tooth element onto its holder.

The present invention may be summarized in a variety of ways, one of which is the following: a modular cutting system for a material volume reduction apparatus, comprising a holder comprising a pair of spaced apart substantially vertical leg portions, a cross member joined to the pair of spaced apart substantially vertical leg portions; a tooth element comprising a top arm spaced above and joined to a bottom arm by a material contacting face portion; the cross member further comprising a top surface, an underside surface interpositioned between the spaced apart leg members and forming the bottom of the cross member, and a channel formed by the spaced apart leg members and the cross-member wherein the channel is configured to frictionally engage and receive the bottom arm of the tooth element while the top arm of the tooth element overlies the top surface of the cross member.

The spaced apart legs and the channel of the holder are preferably configured for frictional engagement with the top and bottom arms and gap of the tooth element enabling the tooth element to be rigidly and removably secured to the holder during use of the apparatus to which they are attached. The frictional engagement between the holder and the tooth element further comprises a cooperating frictional engagement between the contacting surfaces of the holder and the tooth element. The cooperating frictional engagement between the holder and tooth element further comprises an optimum cooperating mating contact therebetween.

The tooth element preferably includes a beveled portion of the bottom surface configured to frictionally engage an angled underside surface of the holder, a planar portion of the bottom surface configured to engage a channel roof of the holder, a back surface configured to engage a front face of the holder, and a roof surface configured to engage a top surface of the holder.

The tooth element may further comprise a supplemental cutting element attached to the front material contacting face. The supplemental cutting element further comprises a pedestal portion and a cap portion extending therefrom. The cap may be concave, convex, or any other shape a desired by the user.

The present invention may also be summarized as follows: a modular cutting system for a material volume reduction apparatus, comprising a cooperating holder and tooth element combination wherein the tooth element frictionally engages the holder during use and removable therefrom when not in use; a pair of spaced apart substantially vertical leg portions, a cross member having a top surface and an underside surface, and a channel defined by the spaced apart leg portions all partially comprise the cooperating holder; and a top arm and a bottom arm merged together by a front material contacting face portion are all associated with the cooperating tooth element; wherein the channel associated with the cooperating holder and the bottom arm of the cooperating tooth element are both cooperatively configured for frictional engagement with one another when the cooperating tooth element is operatively installed onto the cooperating holder. The spaced apart legs and the channel of the cooperating holder cooperatively receive the bottom arm of the cooperating tooth element by the mating contact between the underside surface of the cross-member and the bottom surface of the tooth element.

The cooperating tooth element further comprises a roof surface configured to engage a top surface of the cooperating holder, a back surface configured to engage a front face of the cooperating holder, a planar region of the bottom surface configured to engage a channel roof of the cooperating holder, and a beveled region of the bottom surface configured to frictionally engage an angled underside surface of the cooperating holder.

The present invention may also be summarized as follows: a direct drive material volume reduction apparatus, comprising a frame, a motor supported by the frame, a drum supported by the frame and having an interior and an exterior, a drive shaft operably connected to and extending from the motor, a comminuting wheel assembly including a comminuter wheel with a disk like body portion having an axis; and a gear assembly operably interconnected directly between the drive shaft and the comminuting wheel assembly to operably support the comminuting wheel within the interior of the drum wherein the gear assembly transmits the rotational torque imparted by the motor to the drive shaft and directly transfer it to the comminuter wheel assembly enabling the comminuter wheel to rotate within the interior of the drum.

The tooth assembly of the present invention may, by way of example only, be attached to a comminuter wheel of a direct drive material volume reduction apparatus. Such an apparatus may further include a frame, a motor supported by the frame, a drum supported by the frame and having an interior and an exterior, a drive shaft operably connected to and extending from the motor, a comminuting wheel assembly including the comminuter wheel which has a disk like body portion and an axis; and a gear assembly operably interconnected directly between the drive shaft and the comminuting wheel assembly to operably support the comminuting wheel within the interior of the drum wherein the gear assembly transmits the rotational torque imparted by the motor to the drive shaft and directly transfer it to the comminuter wheel assembly enabling the comminuter wheel to rotate within the interior of the drum. The preferred gear assembly comprises a geared axle assembly of a motorized vehicle, and the geared axle assembly of a motorized vehicle further comprises a rear geared axle assembly of a motorized vehicle having rear wheel drive.

The preferred drum further comprises a substantially cylindrical wall with an open top first end and an open bottom second end; and a closure member to at least partially close the bottom end of the drum. The preferred closure member further comprises a grate mounted adjacent the bottom end of the drum, but more specifically a plurality of individual grate segments. The preferred gear assembly further comprises a hub supported by a distal end of an axle portion wherein the hub and comminuter wheel are cooperatively configured to enable the comminuter wheel to be attached to the hub.

The preferred hub of the material volume reduction apparatus further comprises at least one stud configured to receive a fastener; and the comminuter wheel has at least one bore extending through the body portion parallel to the axis thereof and configured to enable the at least one stud to be inserted into the bore and receive a fastener thereby securing the comminuter wheel interpositionally between the hub and the fastener.

The preferred comminuting wheel further comprises a bracket secured to the comminuter wheel and configured to support a tooth element of the present invention. The comminuter wheel further includes at least one notch formed in the peripheral edge of the wheel; and the at least one bracket further includes a transverse pin sized to be received within the at least one notch of the comminuter wheel to which the at least one bracket is operably attached thereto.

It is the object of the present invention to provide a grinding and/or comminuting apparatus with a modular cutting wheel assembly such that at lease a portion of the assembly can be easily removed for servicing.

It is an object of the present invention to provide a comminuting apparatus with a direct gear drive.

It is an object of the present invention to provide a material volume-reduction apparatus with a wheel component configured to receive easily removable the cutting teeth mounted on the wheel to grind material.

It is an object of the present invention to provide a comminuting apparatus of the type having a rotatable tub and a cutting wheel operably positioned parallel to the floor and within the interior of the tub with a removable tooth assembly defining distinct tiers of cutting elements.

These and other objects, features, and advantages of the present invention shall become apparent after consideration of the scope and content of the disclosure set forth herein. All such objects, features, and advantages are considered an inherent part of the present invention although not specifically set forth.

DETAILED DESCRIPTION OF THE PREFERRED EMBODIMENT(S)

Figure 1:
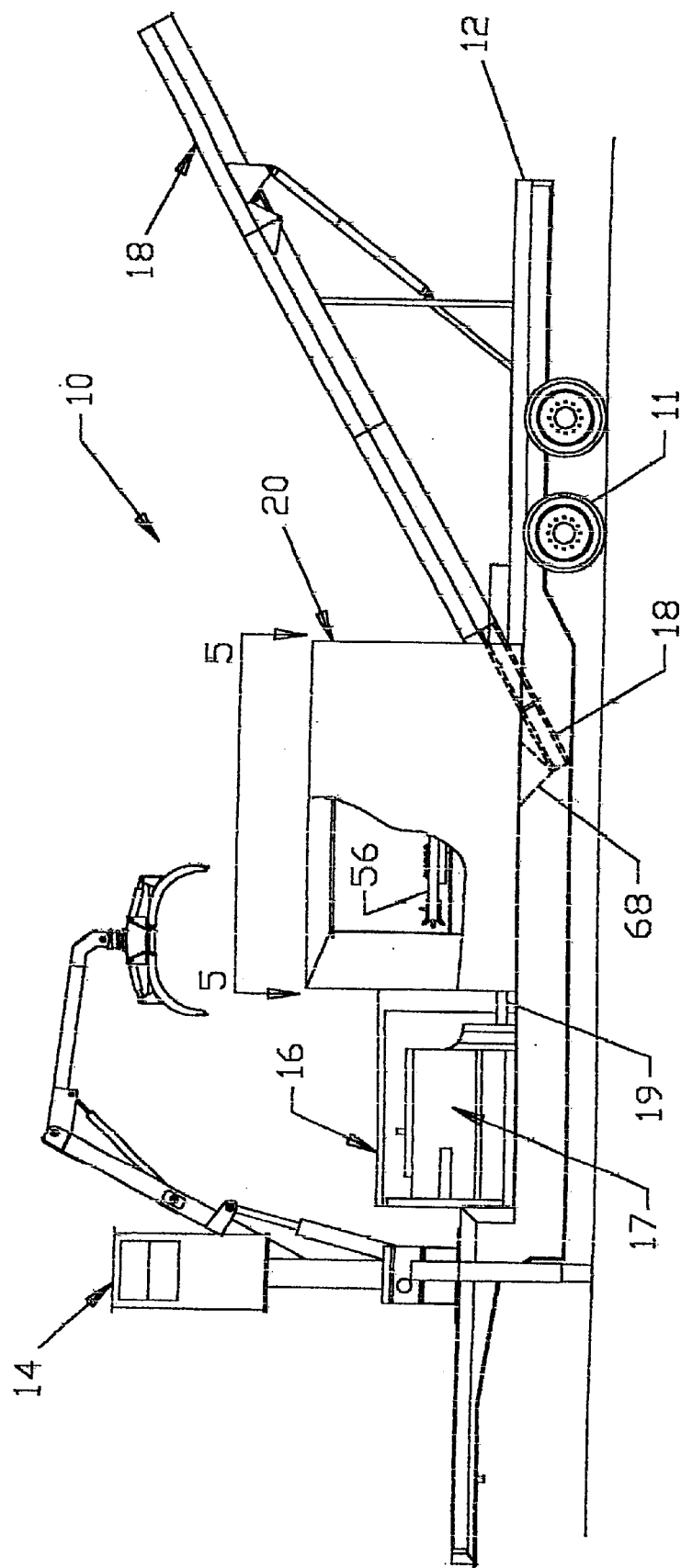
FIG. 1 is a side view of an apparatus which may be fitted with the tooth assembly of the present invention.

With reference to FIG. 1 an embodiment an apparatus, referred to herein as a wood waste grinding machine, is designated generally by reference numeral (10). Embodiment (10) is shown as a mobile component and includes wheels (11) supporting a frame (12). In an alternate embodiment (not shown) a stationary or in place apparatus is substantially similar to the apparatus designated by the reference numeral (10) but the wheels (11) are removed and the platform or frame (12) of the unit is supported by the ground surface on which it rests.

In the preferred embodiment an optional knuckle boom assembly (14) is also supported by the frame (12). Engine assembly (16) includes a motor designated generally by the reference numeral (17), and an optional conveyor (18), both of which are also supported by the frame (12). Shaft (19) extends from the motor (17) to a grinding assembly designated generally by the reference numeral (18).

Figure 4:
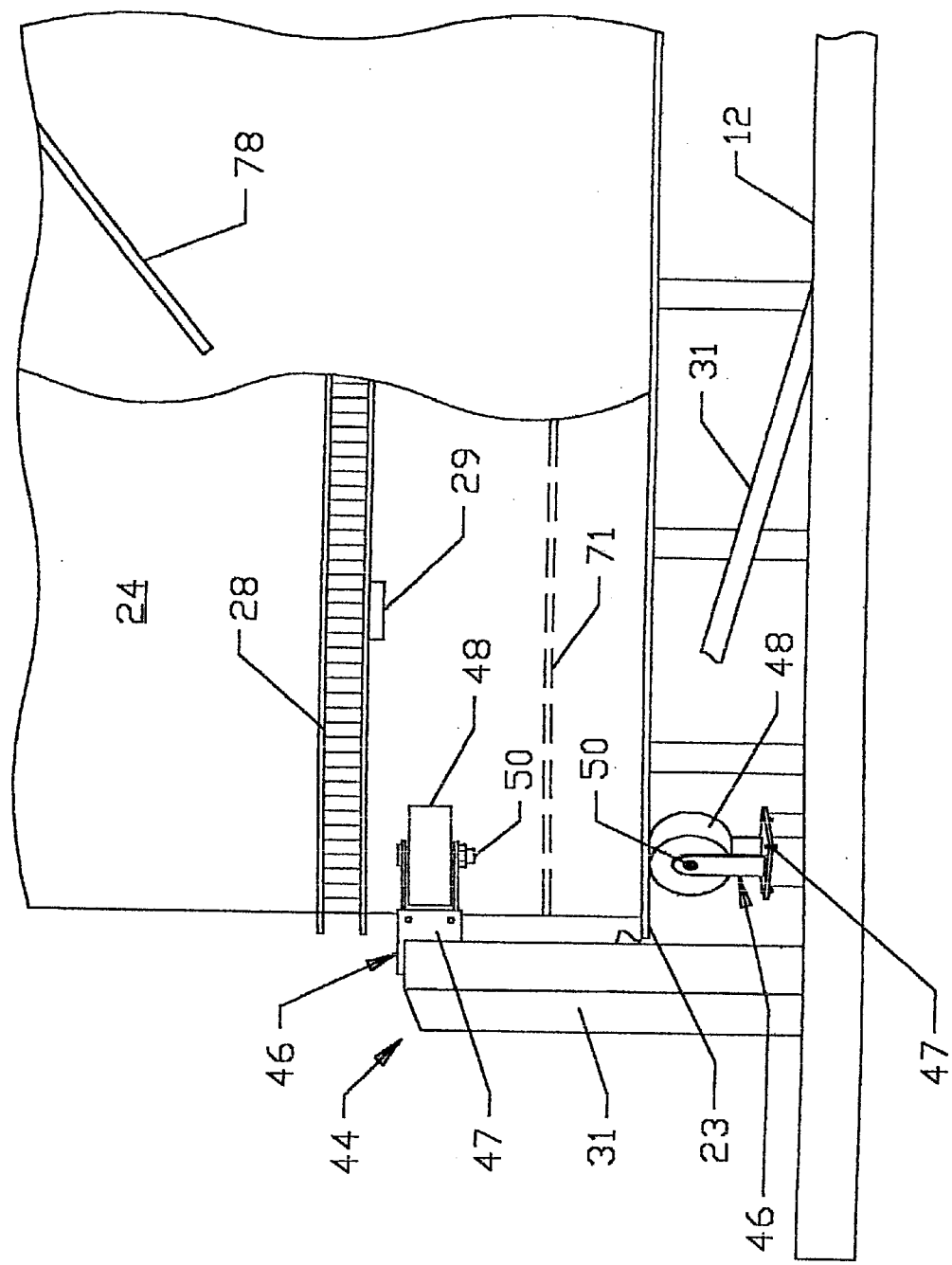
FIG. 4 is an elevated perspective view of a support and centering assembly providing positive support and alignment of a drum component of FIG. 3.
Figure 5:
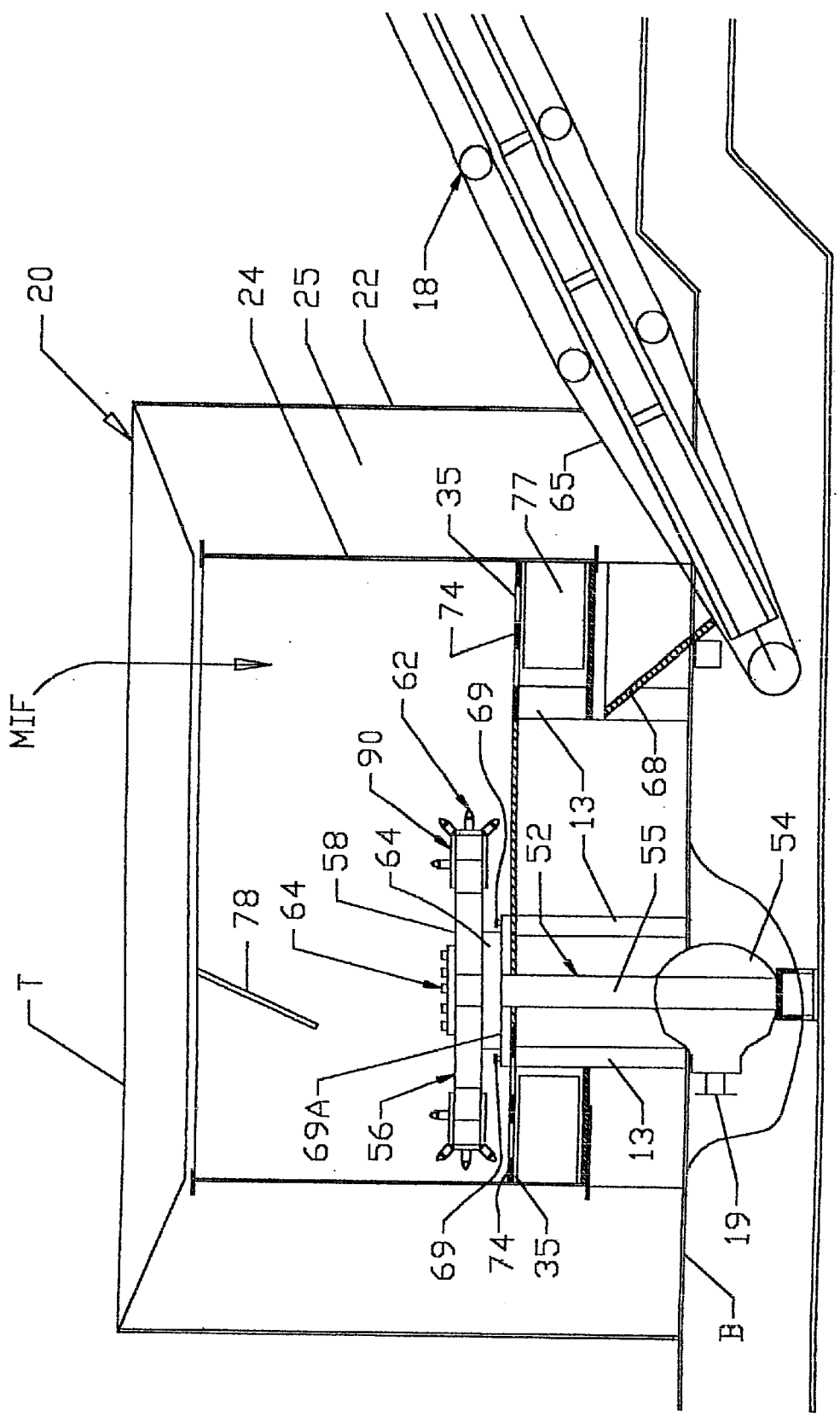
FIG. 5 is a partially cross-sectional side view of the grinding apparatus shown in FIG. 1 and taken along line 5—5 of that figure to reveal an embodiment of the cutting element and an embodiment of the direct drive components of the present invention.

With reference to FIGS. 2 through 5, the grinding assembly (20) (FIG. 2) includes a housing (22) having a top designated by the letter T and a bottom designated by the letter B (See also FIG. 4). A drum (24) preferably of a cylindrical configuration is rotatably mounted on the frame (12) by a plurality of supports (13) and is driven by a drum drive assembly which is designated generally by the reference numeral (26). The drum (24) has an interior grate floor, designated by the dashed lines of FIGS. 2 and 4, and by reference numeral (71). The grate (71) serves as a false bottom to allow ground material to pass through it (i.e., described below as adjoining grate segments (74)) and enter a material collection well (35) as shown in FIG. 5 prior to discharge from the drum (24) through an opening formed therein. The drum (24) also includes an annular flange (23) which provides a wide surface for the support wheels (48) to hold the drum in an elevated position.

A chain (28), surrounding the circumference of the drum (24), is also associated with drive assembly (26). The chain (28) is of a size sufficient to securely engage the drum (24) and rotate it in response to energy supplied to it via the drive assembly (26). Chain guides (29) and sprocket elements that engage the chain (not shown) are preferably rigidly secured to the outer surface of the drum (24) to prohibit the chain from migrating along the cylindrical height of the drum (24).

The aforementioned drive assembly, further includes a support stand (30). Attached to the support stand in operative orientation therewith is a hydraulic motor (32) having a hydraulic fluid supply line (34) to provide a fluid motive force to the hydraulic motor (32) and enable the shaft (38), held in place by the bearing (36), to rotate in response to the fluid pressure. The shaft (38) rotates in response to the applied fluid pressure and causes the attached sprocket (40) to turn. Sprocket (40) engages the chain (28), and the chain (28) rotates the drum (24) as described above. Supplemental sprockets (42) are provided when a plurality of hydraulic drive motors (32) are used. Multiple sprockets are interlaced with one another to keep them rotating in tandem in this configuration.

Figure 2:
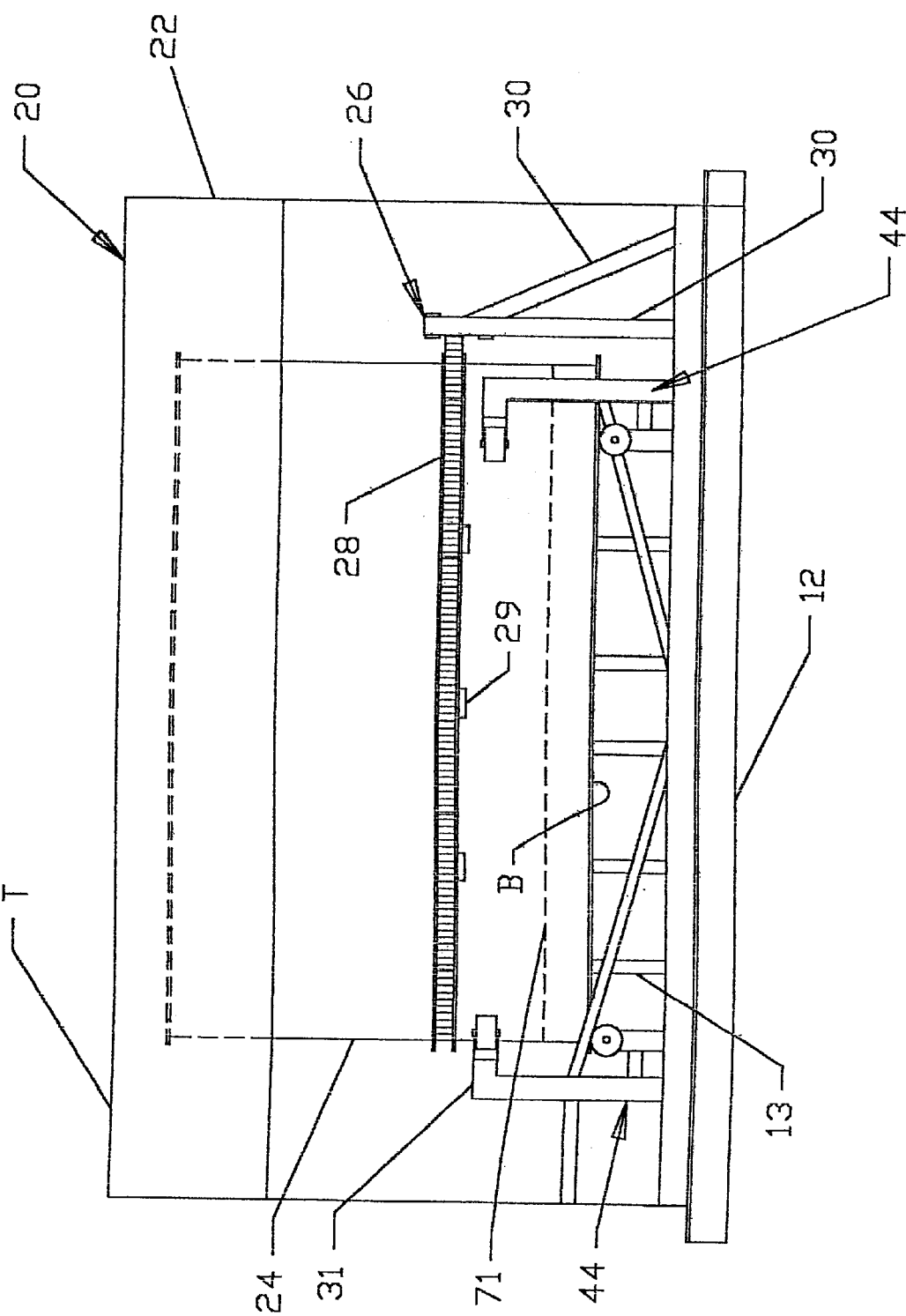
FIG. 2 is a side view of the grinding assembly of the apparatus shown in FIG. 1 with a portion of its housing removed exposing components therein.
Figure 3:
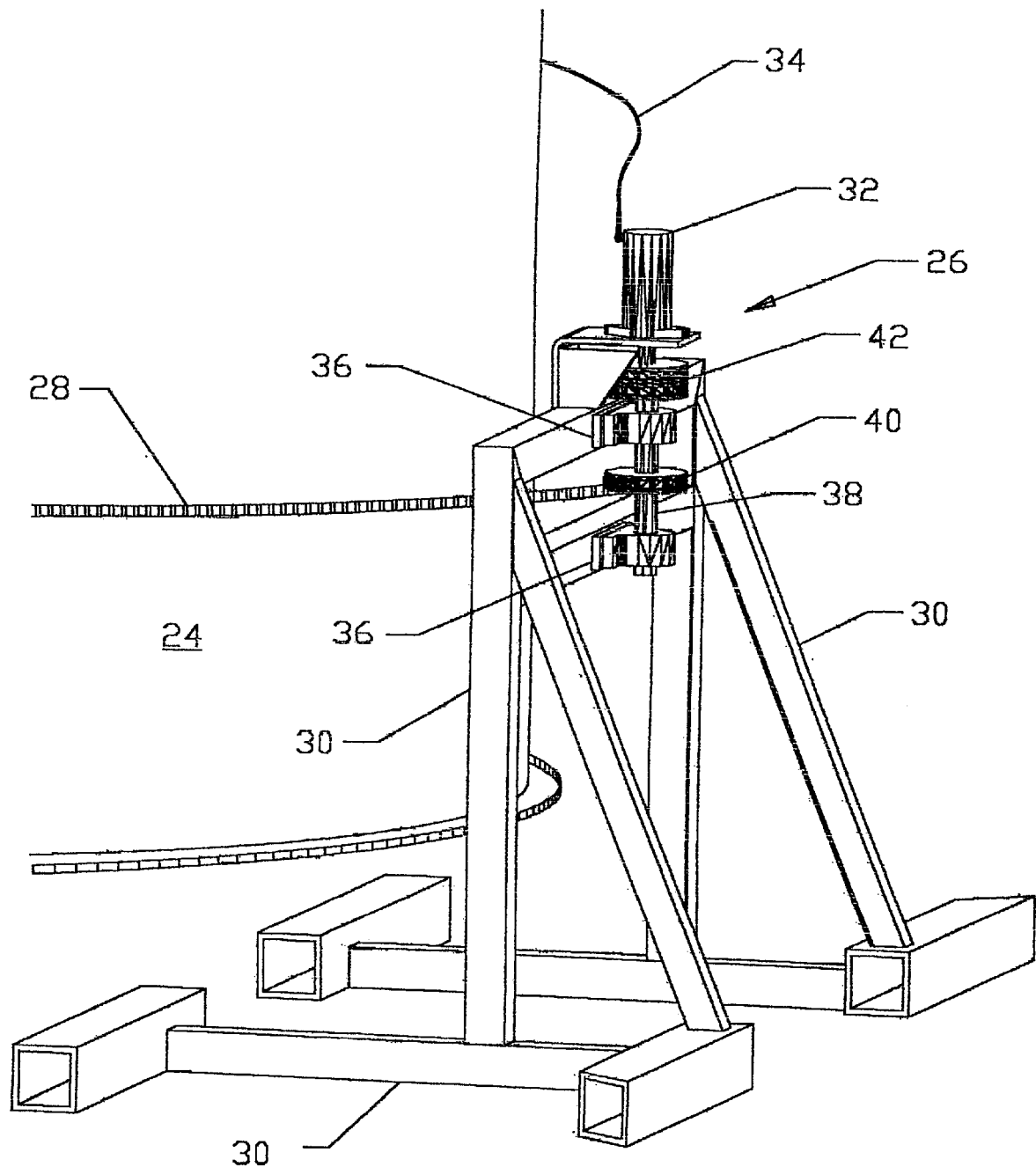
FIG. 3 is an elevated perspective view of a direct chain drive assembly associated with the drum component of the embodiment shown in FIG. 1.

With reference to FIGS. 2 and 4, a support assembly (44) is provided to keep the drum (24) in proper operation and rotational alignment above the frame (12) and its supporting sub-frame (13). The support assembly (44) further comprises a plurality of upright supports (31), and a plurality of rigid wheeled stabilizing assemblies (46) which include wheeled support brackets (47), rigid wheels (48) which are preferably constructed of a machined aluminum to provide a significant amount of structural integrity.

The wheels (48) have axles (50) passing through their center to enable them to turn with respect to the wheel support brackets (47). In combination, one of the wheels

(48) is mounted transverse to the drum (24) on its curved exterior side and a second wheel is mounted vertically beneath the bottom surface of the annular rim (23) adjacent the true bottom of the drum. In the preferred embodiment, there are four such wheel supports, one positioned approximately 90 degrees from an adjacent support such that four supports form an imaginary rectangle wherein the drum (24) is mounted and resides within.

With reference to FIG. 5, an embodiment of the grinding assembly (20) is shown with a portion of the housing (22) and drum (24) removed. An axle assembly (52) and its associated bell housing (54), are positioned and supported by the frame (12). The axle assembly (52) is preferably a conventional rear axle and gear assembly of a rear wheel drive motorized vehicle. In the preferred embodiment a used or recycled rear gear assembly from an over the road diesel or gas operated truck is used. Of course, any such rear axle and associated gear assembly may be used, but a truck assembly was selected to provide the size and torque transmitting capability not found in smaller "rear ends" of other motorized axle-drive vehicles.

An axle (55) extends from the bell housing (54) which has an internal gear system (not shown) and terminates in a distal hub designated generally by reference numeral (64) which is rotatably positioned within the drum (24). A cutting wheel assembly (56) including a disk-like rigid wheel (58) constructed of a hardened steel is attached to the hub assembly (64) in the manner described herein below.

The wheel (58) further includes removable or fixed tooth brackets (90) mounted at its periphery (only two of which are shown in FIG. 5). One embodiment of the tooth component (62) is rigidly secured or attached to the tooth assembly (90) to prevent movement or adjustability from their pre-determined, pre-selected, fixed orientation even though the brackets (90) may be removed from the wheel (58) to resurface worn teeth (62) after use.

Figure 6:
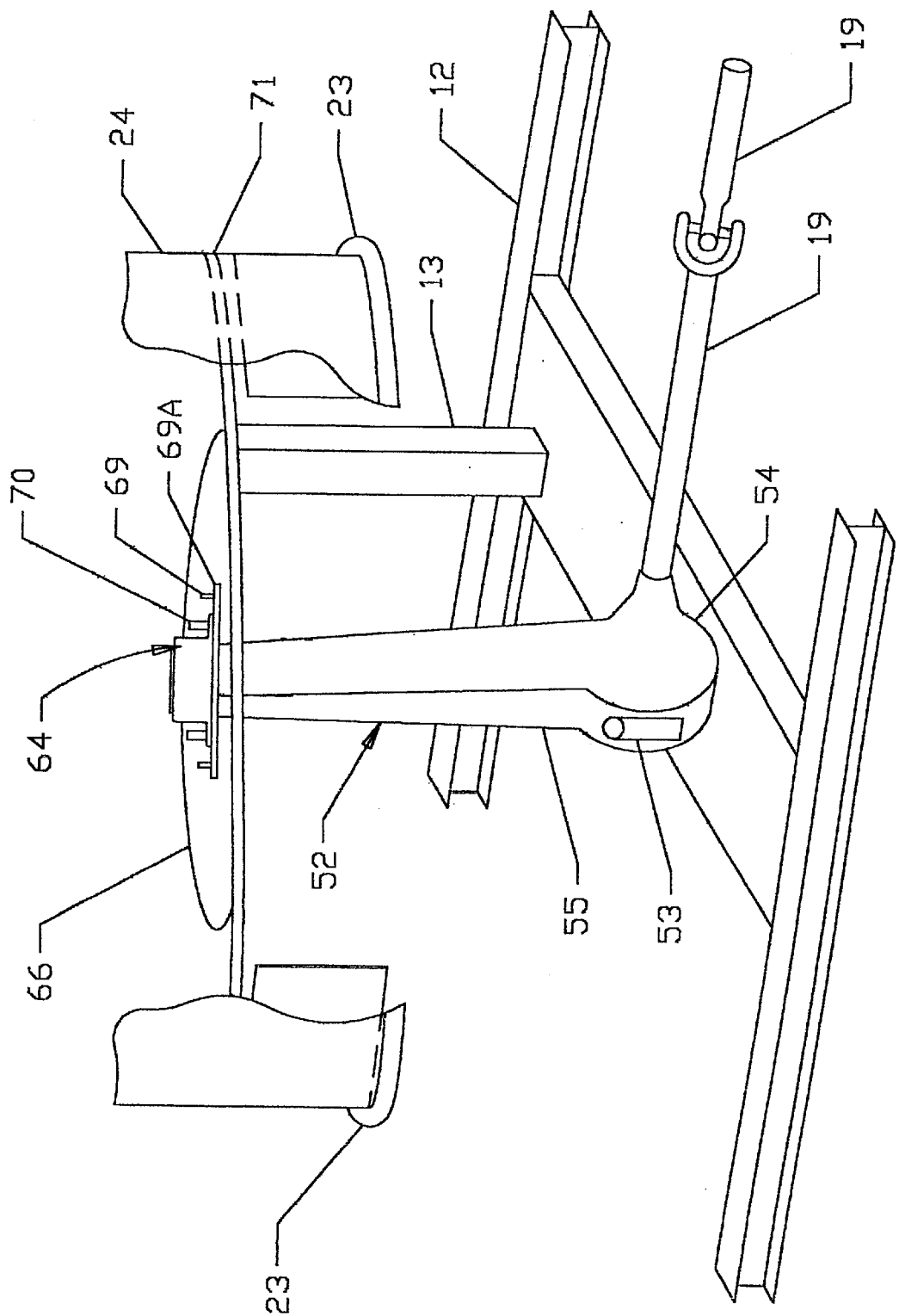
FIG. 6 is an elevated perspective view of an embodiment of the direct drive component of the present invention as shown in FIG. 5.
Figure 7:
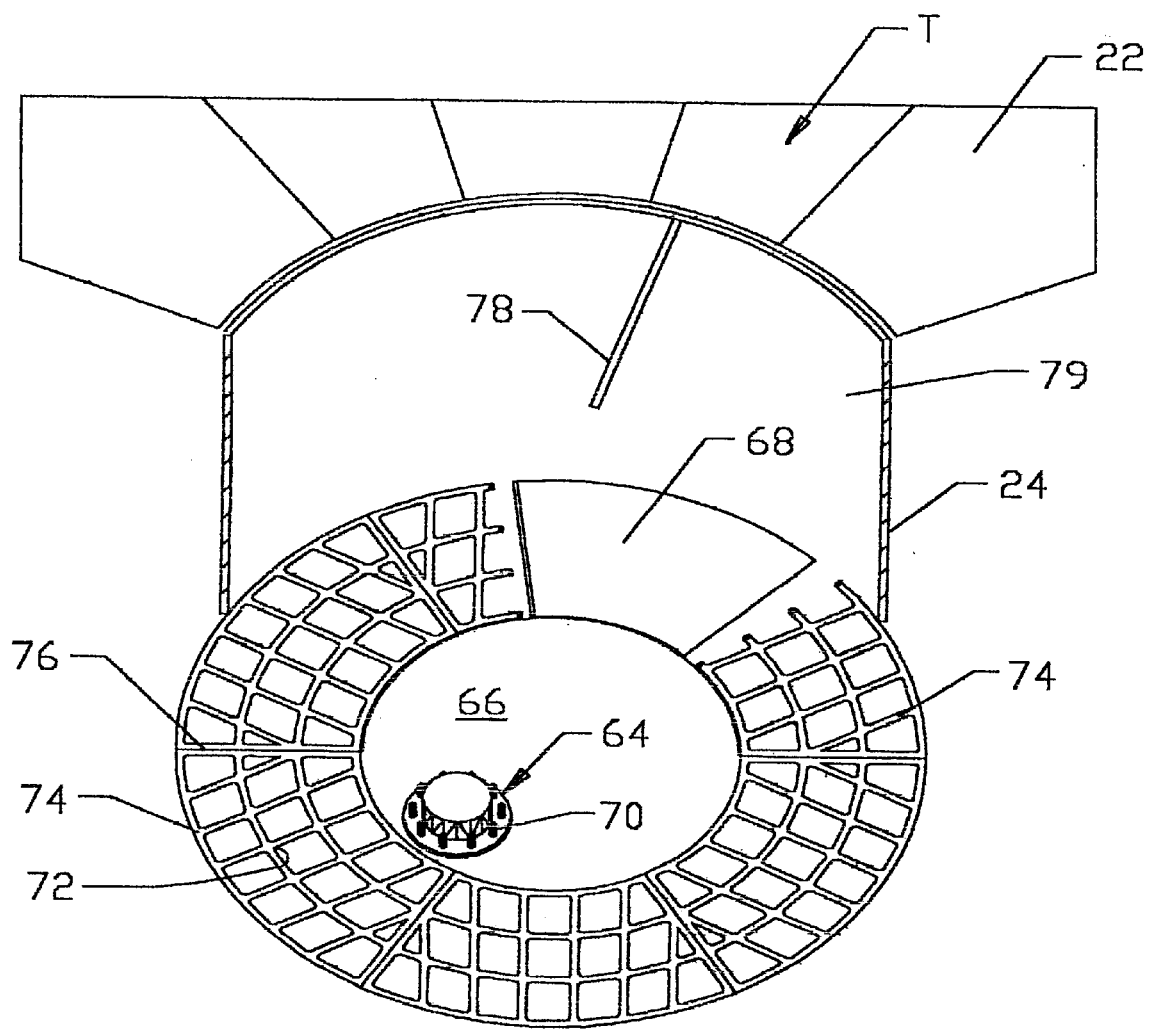
FIG. 7 is an elevated perspective view of the drum portion of FIG. 4.

With reference to FIGS. 5, 6, and 7, in combination, the axle assembly (52) is shown interconnected to a drive shaft assembly or drive shaft means (19) (see FIG. 1) and is operably coupled thereto. As noted the axle assembly (52) may be rigidly secured to the frame (12) by any of a variety of conventional means such as bolts, torque delimiting pins (53), welds, etc., or any number or plurality of each. Plate (69A) and fasteners (69) (e.g., bolts) additionally secure the axle (55) to the center floor section (66).

Hub assembly (64) further includes a plurality of threaded studs (70) extending therefrom. The axle (55) therefore projects through an aperture in the center floor section (66), causing the hub (64) to reside within the interior of the drum (24) (best seen in FIG. 7). Exit chute (68) is provided in the grate floor (71) which is partially comprised of a plurality of removable grate segments (74) that are placed in side-by-side relationship as shown and illustrated generally and display a seam (76) existing therebetween. The seam (76) between adjacent grate segments (74) overlies a material discharge fin (77) which is rigidly secured to the interior wall of the drum (24). The fin(s) (77) enable adjoining grate segments (74) to be placed in a side by side relationship in such a way that their side edges (75) are parallel and rest on the inwardly projecting portion of the drum wall.

In use, the rotation of the drum (24) enables the inwardly projecting fins (77) extending from the interior wall surface of the drum (79) to rotate and move material (not shown) that has passed through the grate floor (71) around the periphery of the drum (24) and resides inside the well (35) on the true bottom floor of the drum (24). The material is continuously moved by the fins (77) in a circular path so long as the drum (24) rotates. The material is moved toward the exit chute (68) and dispensed from the drum through an opening in the true floor. The escaping material is carried out of the housing (25) by the conveyor (18) which extends under the housing (25) to converge with the exit chute (68) (FIG. 1). The removal or takeoff conveyor (18) preferably has a moving belt (65).

A single grate assembly may be used or individual grate segments (74) may be rigidly secured and attached to one another by a variety of conventional means. It is believed best to use a plurality of grate segments (74) with a user selected slat (72) configuration. The spacing between adjacent slats (72) in large part determines the particle size of the material escaping the drum (24) (i.e., the processed material "MIF" of FIG. 5).

Optional agitator bar (78) is secured to the interior wall surface (79) of the drum to urge material placed into the drum for processing and volume reduction to move with the drum as it rotate and eventually come in contact with the rotating wheel (58) secured to the axle assembly (52) via the hub assembly (64) and driven by the motor and shaft combination, (17) and (19) respectively.

Figure 8:
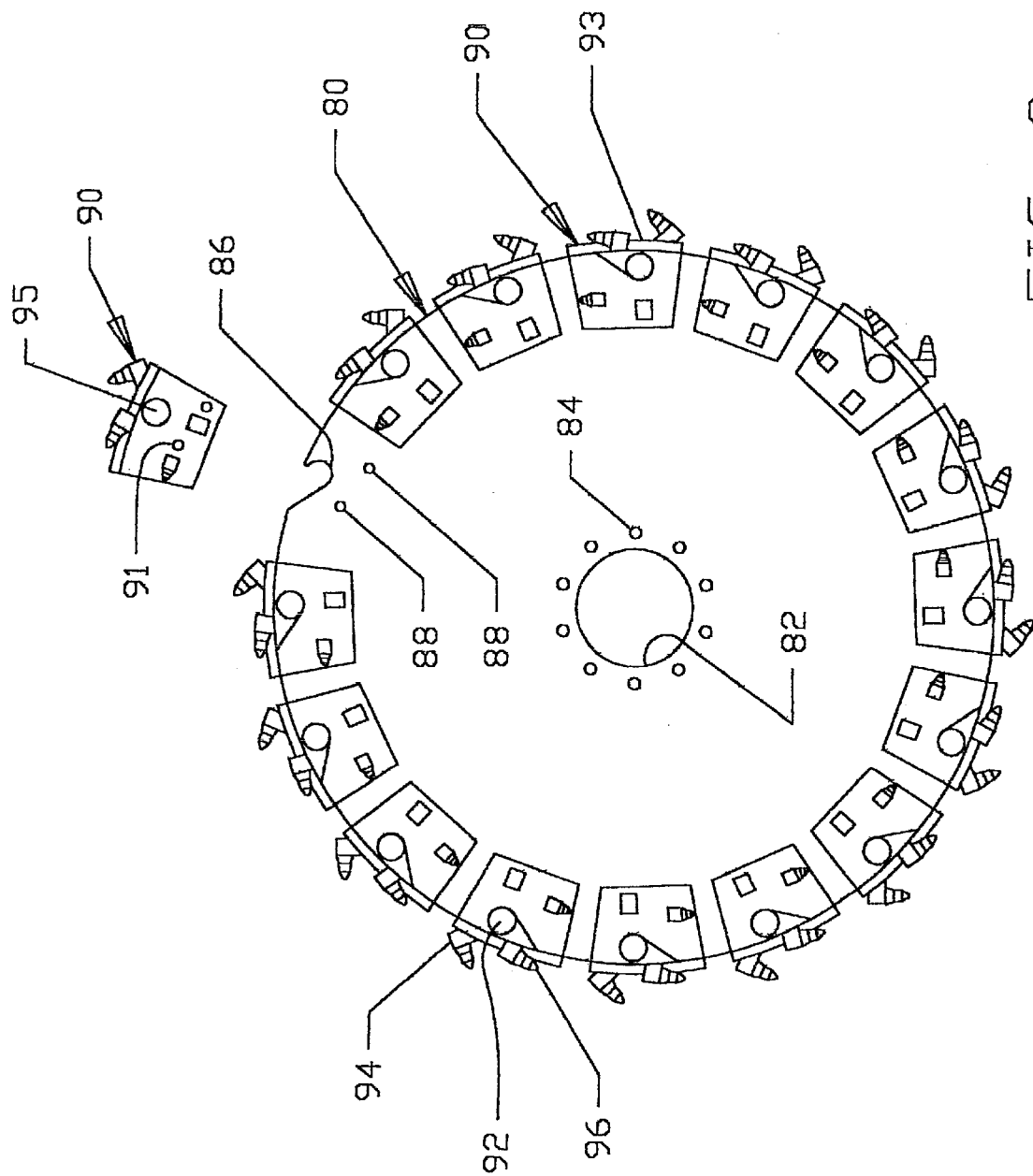
FIG. 8 is a top view of an embodiment of a work piece onto which the present invention may be attached.
Figure 9:
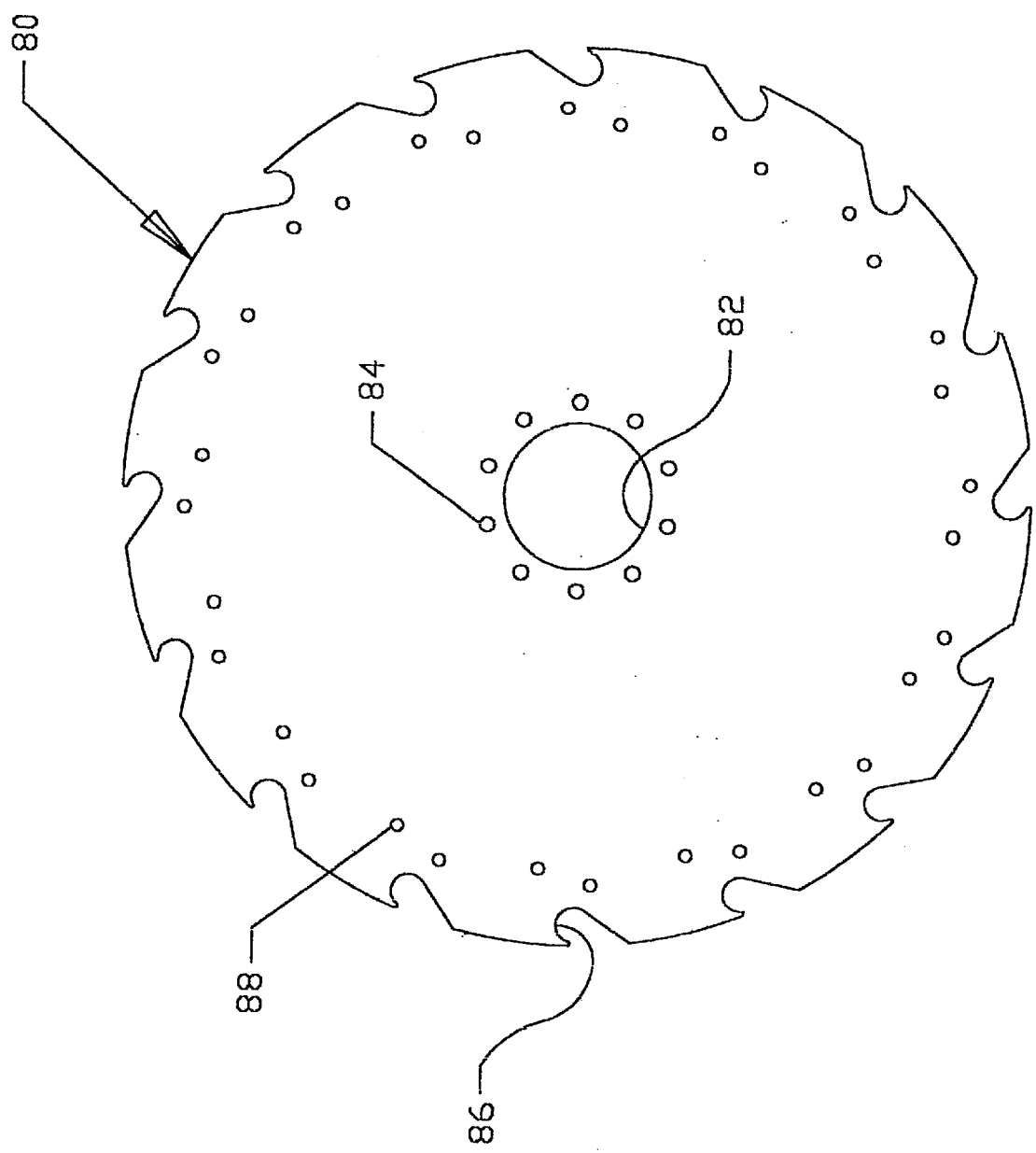
FIG. 9 is a top view of an embodiment of a work piece onto which the present invention may be attached.
Figure 10:
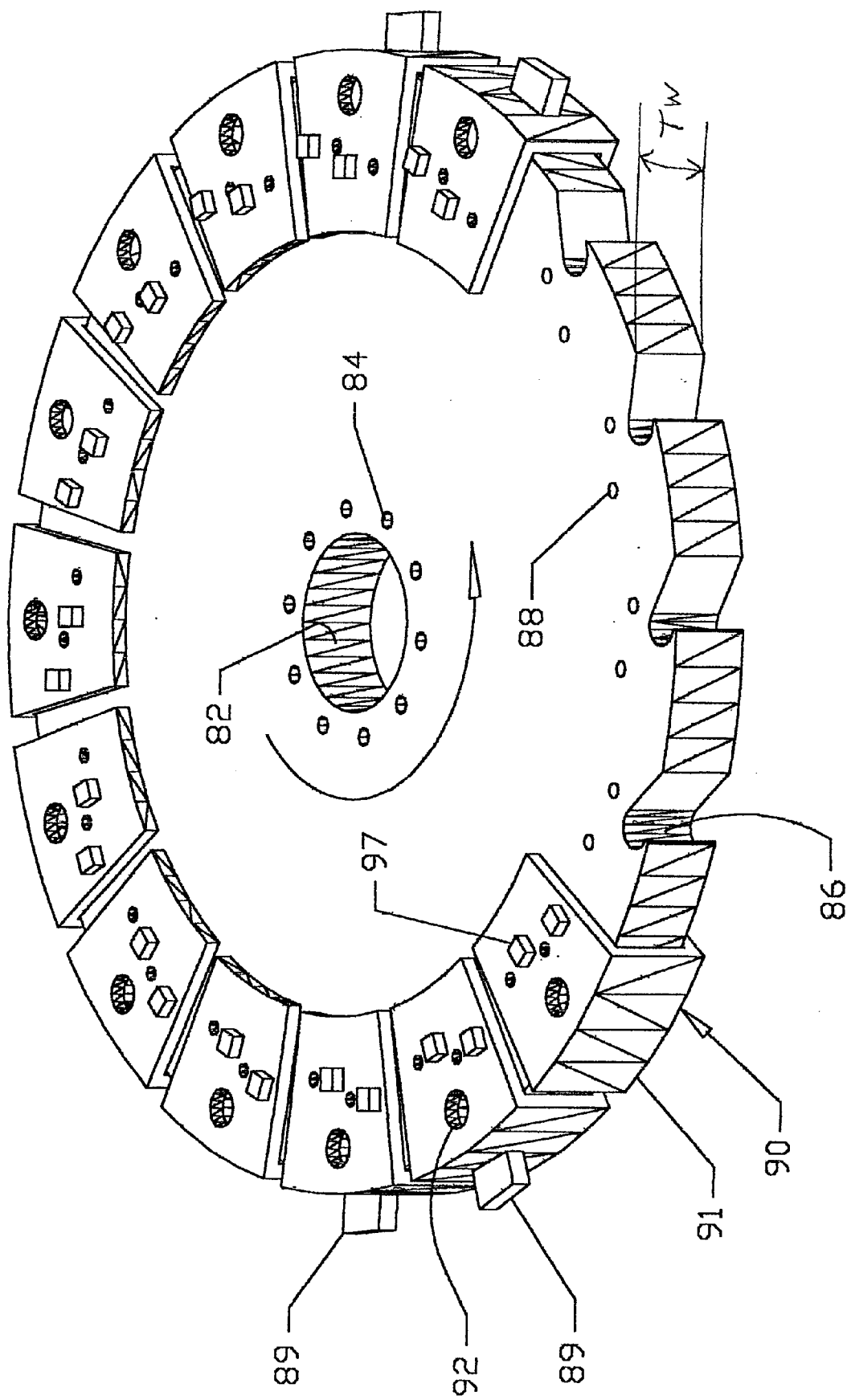
FIG. 10 is an elevated perspective view of an alternate embodiment of the wheel shown in FIG. 8 and FIG. 9.

With reference to FIGS. 8, 9, and 10, an embodiment of the wheel assembly used in conjunction with an embodiment of the present invention is designated in generally by the reference numeral 80. Associated with the wheel assembly (80) is a hub receiving orifice (82) surrounded by stud receiving bores (84) which receive the hub assembly (64) and threaded studs (70), respectively. The wheel is secured to the hub via a plurality of nuts or other fasteners (not shown). Also associated with the wheel assembly (80) is a plurality of angled notches (86) formed around its periphery to give it a circular-saw blade look as illustrated best in FIG. 9.

A plurality of bolt-receiving bores (88) are provided to engage the tooth assembly (90) having corresponding compatible bores (91) both of which (88 and 91) receive a conventional fastener (not shown) to secure the tooth assembly and its associated bracket (93) to the wheel periphery. A large diameter pin (92) of a cylindrical configuration is inserted into a large diameter bore (95) of the bracket (93) and occupies the angled notch (86) during operation. In use, the wheel turns in the direction of the angled notch in much the same manner a circular-saw blade would turn when cutting a piece of wood. Attached to the brackets (93) and rigidly secured thereto to prevent movement or adjustability from their desired orientation are a series or plurality of teeth designated generally in FIG. 10 by the reference numeral (89).

There are several embodiments of the teeth (89), one of which includes a tooth holder (94) having a removable tooth member (96) removably mounted thereto. In addition, tooth (89) comprises fixed or unitary tooth (97) welded or otherwise rigidly attached to the bracket (93). Bolt shrouds (97), preferably formed of hardened steel or hardened surface welds, are provided to minimize abrasion of the fasteners (not shown) which secure the brackets (93) to the periphery of the wheel.

Figure 11:
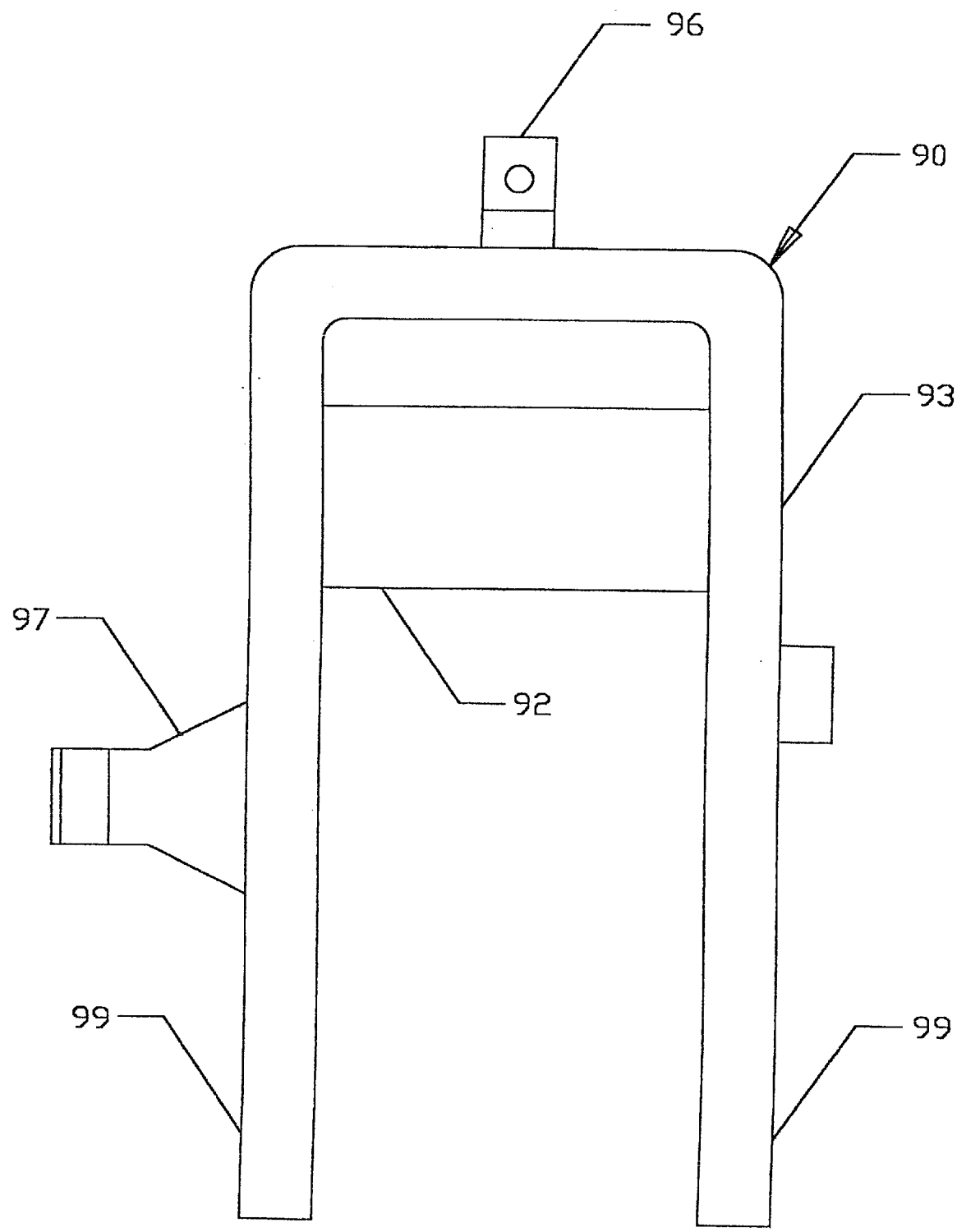
FIG. 11 is an elevated perspective view of an alternate embodiment of a tooth-carrying bracket or tooth assembly of the present invention and further illustrating three alternate embodiments of the tooth components of the present invention, one of which is preferred.
Figure 12:
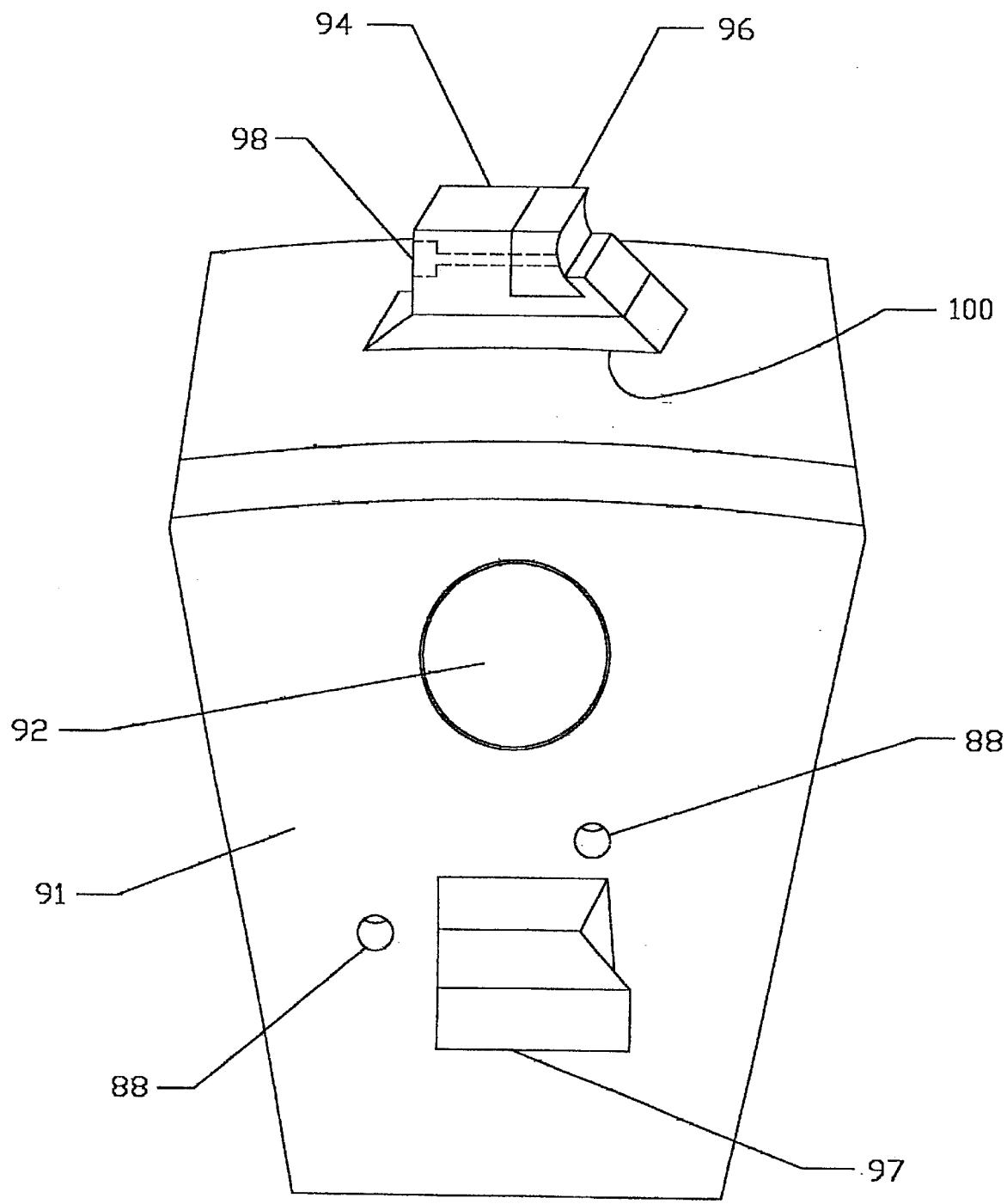
FIG. 12 is an elevated perspective side view of the bracket mechanism illustrated in FIG. 11.
Figure 13:
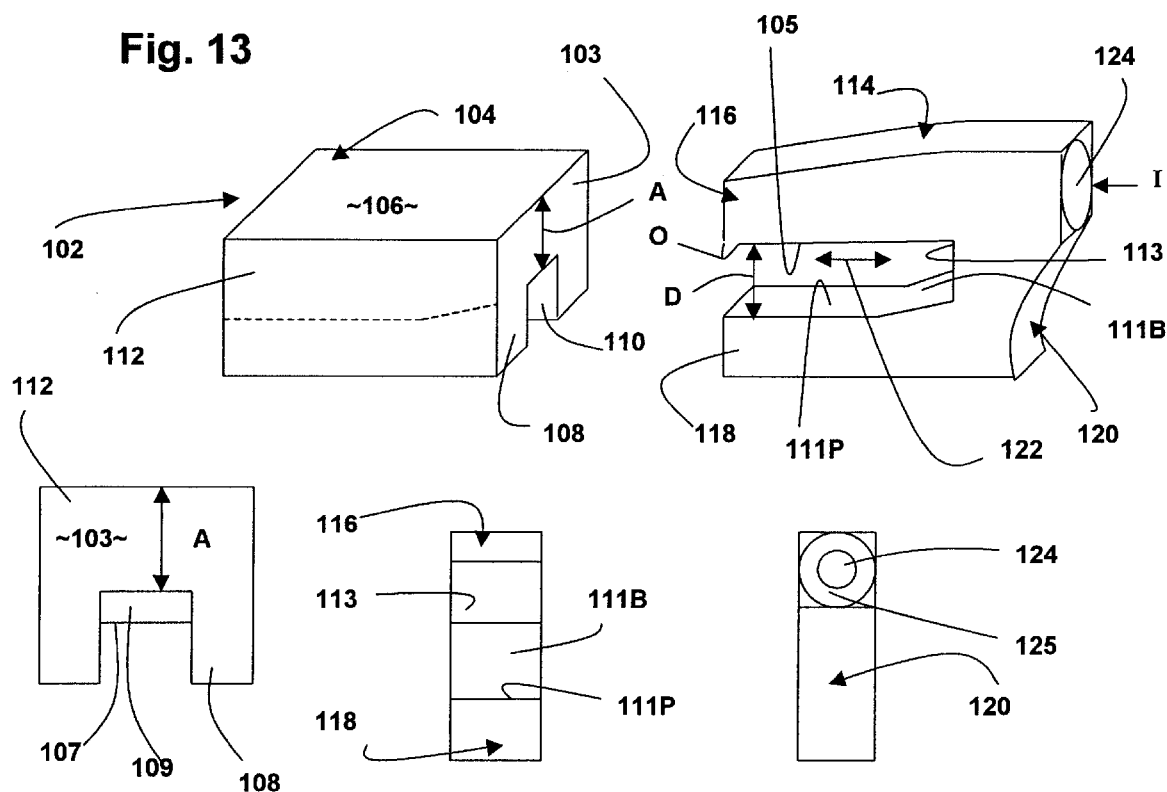
FIG. 13 is an elevated exploded perspective view of a preferred embodiment of the tooth assembly.
Figure 14:
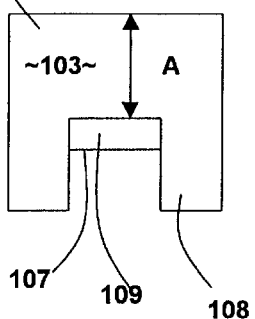
FIG. 14 is a front view of the holder shown and referenced in FIG. 13.
Figure 15:
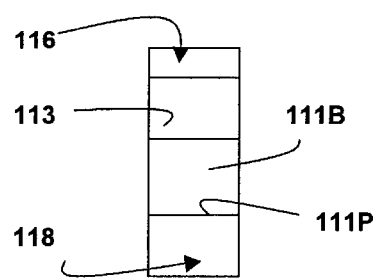
FIG. 15 is a rear view of the tooth element shown and referenced in FIG. 13.
Figure 16:
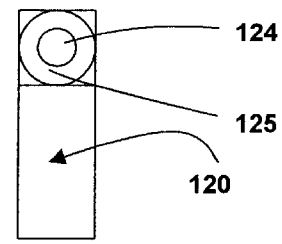
FIG. 16 is a front view of the tooth element shown and referenced in FIG. 13.

With reference to FIGS. 11 and 12, the modular tooth assembly (90) or teeth (97) are mounted to the brackets (93) which have spaced apart leg components (99) joined by a cross member (101). The pin (92) (mentioned above) is of a length and sized to be positioned therebetween. Tooth holders (94) or teeth (97) are secured to the surface of the legs (99) or the cross member (101) by a hard surface weld (100)

wherever they are desired. Removable tooth components (96) of one of the embodiments are rigidly secured and prevented from adjustability by a bolt attachment (98) through a series of threaded bores which extend from the tooth holder (94) and into the tooth components (96).

With regard to the preferred embodiment of the tooth assembly, designated generally by the reference numeral (1010). Embodiment (1010) of FIG. 12 includes a holder (102), removable tooth element (114), and optional supplemental cutting implement (115). As shown, a top arm (116) of the tooth element (114) overlies the holder (102) and extends beyond is horizontal length. In this way the overhang portion, designated generally by the reference letter "O", provides a resilient snap fit between the tooth element (114) and the holder (102) when the tooth element (114) if forcibly driven into an installed position with respect to the holder (102) as described below.

FIGS. 13–16 further illustrate the preferred embodiment of the modular tooth assembly (1010). Tooth assembly (1010) includes a holder (102) comprised of a rectangular body (104) having a pair of spaced apart legs (108) and cross-member (112) having a top surface (106). The spaced apart legs (108) and the cross-member (112) define a channel (110) sized to frictionally receive a portion of the tooth element designated generally by the reference numeral (114).

Tooth element (114) comprises a top arm (116) and a bottom arm (118) joined by a front face portion designated generally by the reference numeral (120). Interpositioned between the top and bottom arms (116) and (118) is a gap (122) having a separation distance ("D") which is slightly greater than the height ("A") of the front face (103) of the holder (102). Within the gap (122) is a planar region of the bottom surface (111P), an optional beveled region of the bottom surface (111B), a back surface (113), and a roof surface (105).

When the tooth element (114) is installed with respect to the holder (102), the optimum cooperating mating contact between the components (102) and (114) includes the following:

A. the beveled region of the bottom surface (111B) of the tooth element (114) frictionally engages the angled underside surface (109) of the holder (102);

B. the planar region of the bottom surface (111P) of the tooth element (114) engages the channel roof (107) of the holder (102);

C. the back surface (113) of the tooth element (114) engages the front face (103) of the holder (102); and D. the roof surface (105) of the tooth element (114) engages the top surface (106) of the holder (102) and the overhang portion "O" of the top arm (116) extends beyond the top surface (106).

Of course, a less than optimum (i.e., congruent mating contact) between the elements may be used and still provide an adequate attachment between the holder (102) and the tooth element (114). This is believed primarily due to the direction in which the impact forces, designated generally by the reference letter "I" of FIGS. 12 and 13, will contact the tooth element (114) during use of the workpiece outfitted with the inventive tooth assembly. The direction of this impact can be described as "inward" which has a tendency to tighten the cooperating engagement of the tooth element (114) to the holder (102).

Figure 17A:
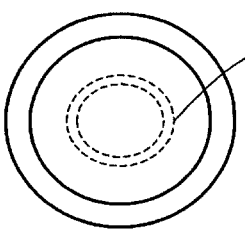
FIG. 17A is a front view of an optional insert used in conjunction with the tooth element of FIGS. 13, 15 and 16.
Figure 17B:
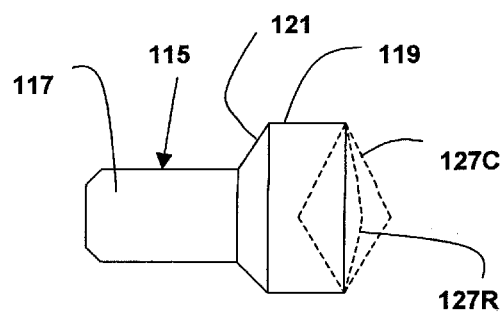
FIG. 17B is a side view of the insert shown in FIG. 17A.

Tooth element (114) further comprises a working surface (124) which may be coated for hardness or fitted with a supplemental cutting implement (115). An example of a preferred embodiment of the cutting element (115) is shown in FIGS. 17A and 17B, and includes a pedestal portion (117), an integral cap (119), as well as an annular taper (121) which is sized to mate with the countersink (125) of the tooth element (see FIG. 16). Cap (119) further includes a concave portion (123) which is provided to maintain a sharp cutting edge as the cutting element (115) wears during use. Alternatively, the cap may have a convex portion (127C) or rounded portion (127R) as shown in the dashed lines of FIG. 17B.

FIGS. 18–21 illustrate an alternate embodiment of the tooth holder or bracket portion of the invention. The bracket (128) shown in these figures consists primarily of a series of disks of varying size positioned in stacked concentric relationship with one another. The base portion (130) includes a plurality of bores (132) which are receive bolts or other fasteners (not shown) in order to secure the base portion (130) to the wheel (80) (see FIGS. 8–10).

Figure 20:
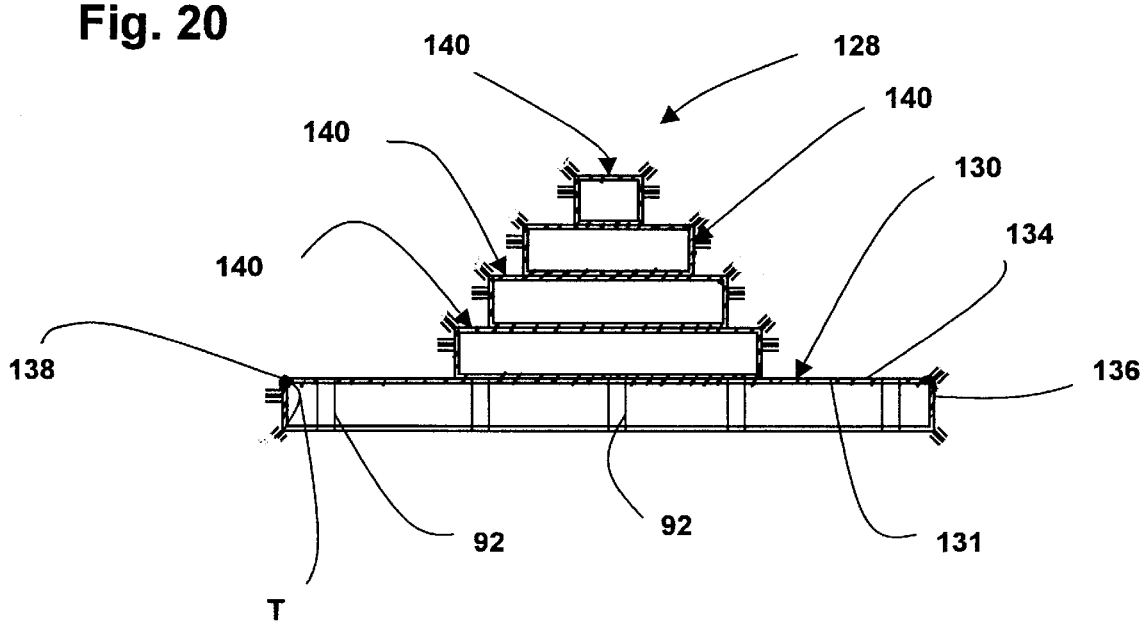
FIG. 20 is a side cross-sectional view of the embodiment shown in FIG. 19 taken along line 20—20 of that Figure.

Base portion (130) further includes a substantially horizontal top surface (134), a substantially vertical downwardly extending side wall (136) and an edge (138) interpositioned therebetween. The base portion (130) is preferably constructed by providing a round portion of plate and welding the vertical side wall (136) around the edge of the plate. With reference to FIG. 20, the inside height "T" of the sidewall (136) preferably corresponds to the thickness of the wheel "TW" as shown in FIG. 10 in order to allow the base portion (130) to be positioned over the wheel (80) and bolted thereto.

Figure 21:
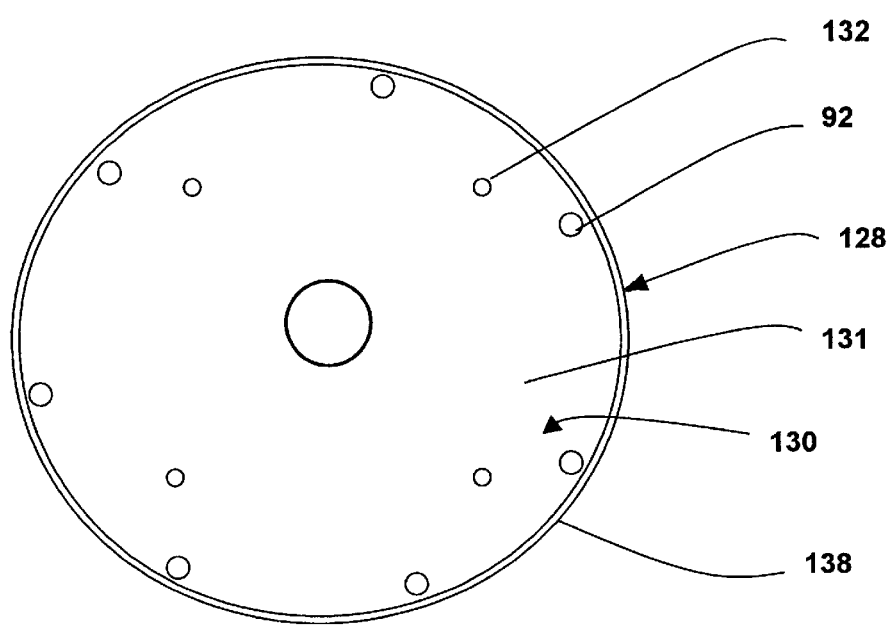
FIG. 21 is a bottom view of the alternate embodiment shown in FIG. 18 when viewed in the direction of the arrow "F21" of that Figure.

With reference to FIGS. 11, 12 and 21, pin (92) is secured to the bracket assembly as shown in the respective Figures. Pin (92) engages the slot (86) of the wheel (80). With respect to the embodiments shown in FIGS. 18–23, the pin (92) is inserted down into the slot (86) of the wheel (80) when the base portion (130) is fitted over the top of the wheel (80), much like a cover, as mentioned above. In this way, the pin are rigidly secured to the opposing underside (131) of the top surface (134) of the base portion (130). Bores (132) of the base portion (130) align with at least some of the threaded bores (88) of the wheel (80) and both are capable of receiving bolts (not shown) to secure the base portion (130) to the wheel (80).

Figure 18:
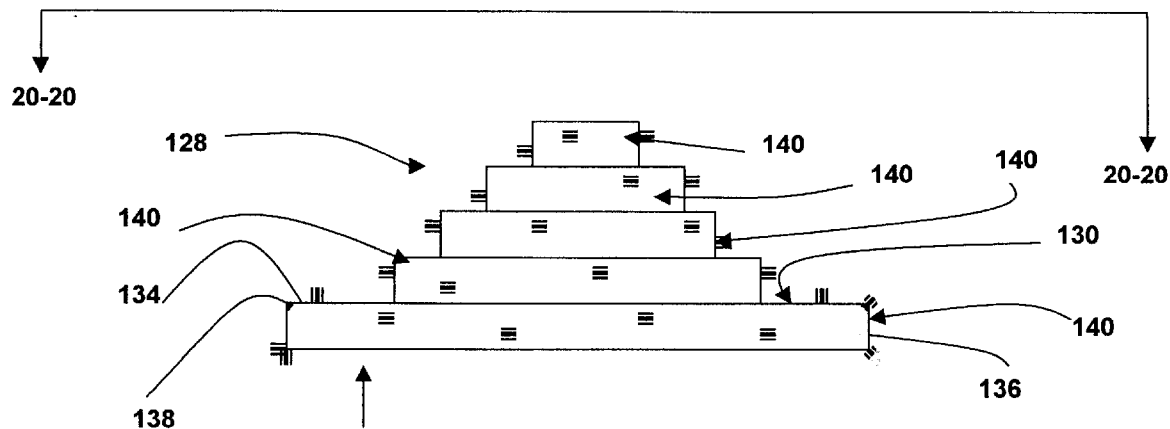
FIG. 18 is side view of an alternate embodiment of the bracket assembly of the present invention.
Figure 19:
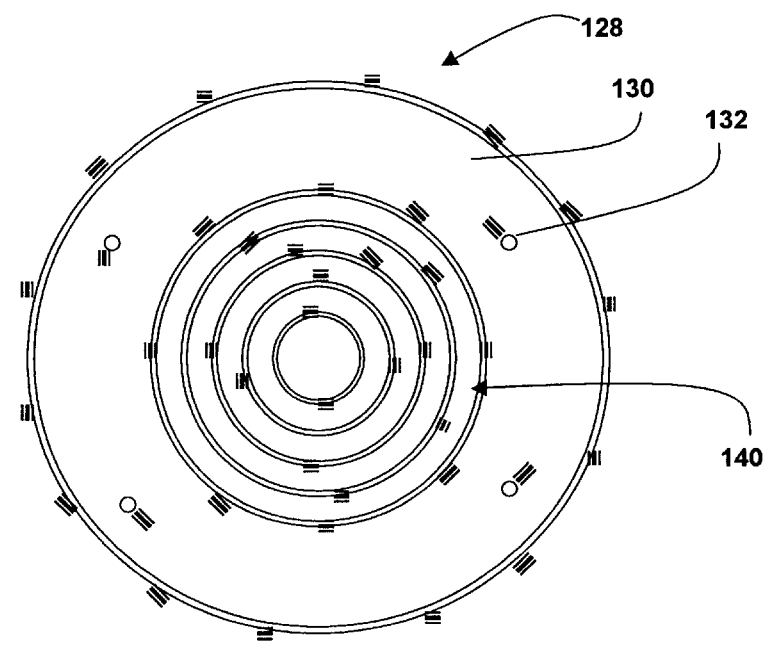
FIG. 19 is top view of the alternate embodiment of the bracket assembly shown in FIG. 18.

With reference to FIGS. 18–20, a series of concentric disks designated generally by the reference numeral (140) are rigidly secured to the base portion (130). The number of disks (140) may very depending upon the desired construction and perhaps the materials being comminuted. In addition, the embodiment shown in FIGS. 22 and 23 includes a somewhat conical bracket (142) which is believed to approximate the concentric disk arrangement shown in FIGS. 18–20 and may prove to be a suitable equivalent thereof despite the apparent complexity of its manufacture.

Figure 22:
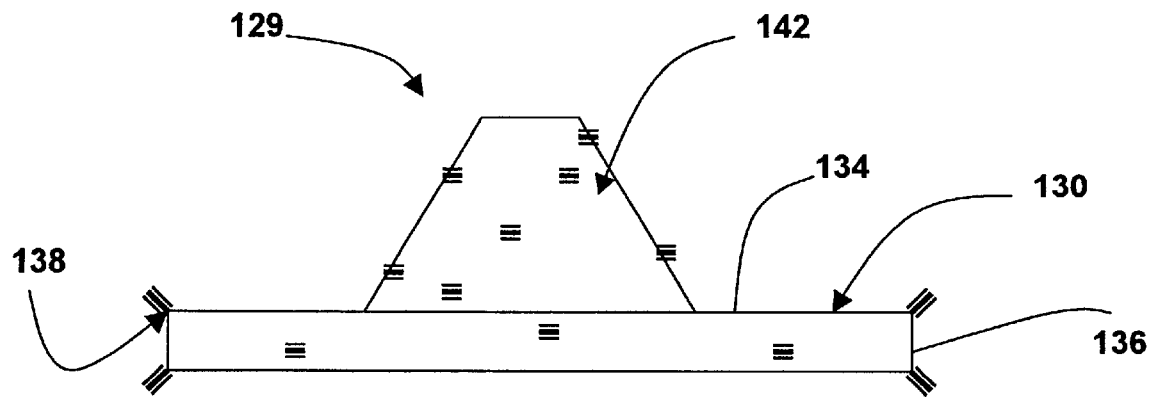
FIG. 22 is an exploded elevated perspective view of an alternate embodiment of the bracket assembly of the present invention.
Figure 23:
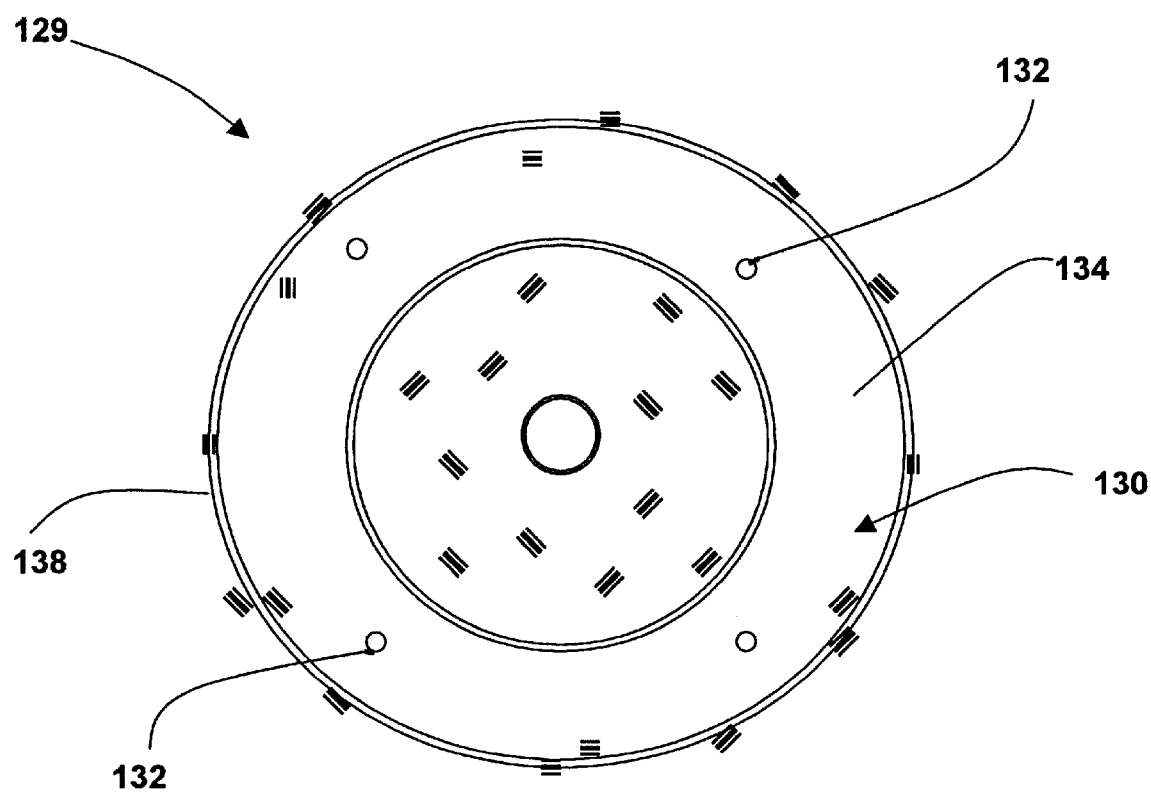
FIG. 23 is a top view of the embodiment shown in FIG. 22.

In each case, the brackets (90) of FIGS. 10–12, (128) of FIGS. 18–21 and (129) of FIGS. 22 and 23, preferably include at least one tooth assembly (1010) rigidly secured to the bracket (90), (128) and (129) as shown in the aforementioned figures and described with respect to the alternate embodiment thereof as set forth herein. In use, the preferred drum is rotated in a left or right forward direction as viewed from the top, while the wheel assembly (80) turns in an opposite right or left forward direction such that the drum moves material into contact with the wheel (80) during operation.

The direct drive of the present invention is more thoroughly described as a direct transfer of rotational torque from the engine component (17) via the drive shaft assembly (19) which connects to the gear assembly (not shown)

located within the bell-housing (54) of the gear assembly (52) whose axle arm (55) extends up through an aperture in the drum floor (24) to receive the wheel assembly (80) or (56) depending on the embodiment. Accordingly, when the drum (24) is rotated and the wheel is rotated via the direct drive and the gear assembly (52), the grate segments (74) rotate with the drum while the center floor portion (66) remains stationary as would be the case due to the positioning of the hub (64) through the floor (66) as best shown in FIG. 7.

These and other embodiments and/or equivalents thereof shall become apparent after consideration of the disclosure set forth herein via the specification, drawings and claims. All such alternate embodiments and/or equivalents hereof are contemplated as within the scope of the present invention even though not specifically set forth herein due to economy of space and print limitations.

What is claimed is:

1. A modular cutting system for a material volume reduction apparatus, comprising:
   a holder comprising a pair of spaced apart substantially vertical leg portions, a cross member joined to the pair of spaced apart substantially vertical leg portions;
   a tooth element comprising a top arm spaced above and joined to a bottom arm by a material contacting face portion;
   and a beveled region on a top surface of the bottom arm configured to frictionally engage an angled underside surface of the holder;
   the cross member further comprising a top surface, an underside surface interpositioned between the spaced apart leg members and forming the bottom of the cross member, and a channel formed by the spaced apart leg members and the cross-member wherein the channel is configured to frictionally engage and receive the bottom arm of the tooth element while the top arm of the tooth element overlies the top surface of the cross member.

2. The modular cutting system of claim 1, wherein:
   the tooth element further comprises a planar region of the bottom surface configured to engage a channel roof of the holder.

3. The modular cutting system of claim 1, wherein:
   the tooth element further comprises a back surface configured to engage a front face of the holder.

4. The modular cutting system of claim 1, wherein:
   the tooth element further comprises a roof surface configured to engage a top surface of the holder and a portion of the top arm of the tooth element resiliently overhangs the holder.

5. The modular cutting system of claim 1, wherein:
   the spaced apart legs and the channel of the holder are configured for frictional engagement with the top and bottom arms enabling the tooth element to be rigidly and removably secured to the holder during use of the apparatus to which they are attached.

6. The cooperating frictional engagement between the holder and tooth element of claim 5, further comprising:
   an optimum cooperating mating contact therebetween.

7. The cooperating frictional engagement between the holder and tooth element of claim 6, wherein:
   the tooth element further comprises a roof surface configured to engage a top surface of the holder, a back surface configured to engage a front face of the holder, a planar region of the bottom surface configured to engage a channel roof of the holder, and a beveled region of the bottom surface configured to frictionally engage an angled underside surface of the holder.

8. The modular cutting system of claim 1, wherein the tooth element further comprises:
   a supplemental cutting element attached to the front material contacting face.

9. The modular cutting system of claim 8, wherein the supplemental cutting element further comprises:
   a pedestal portion and a cap portion extending therefrom.

10. A modular cutting system for a material volume reduction apparatus, comprising:
    a cooperating holder and tooth element combination wherein the tooth element frictionally engages the holder during use and removable therefrom when not in use;
    a pair of spaced apart substantially vertical leg portions, a cross member having a top the cooperating tooth element comprises a beveled region on the top surface of the bottom arm configured to frictionally engage the underside surface of the cross member; surface and an underside surface, and a channel defined by the spaced apart leg portions all partially comprise the cooperating holder; and
    a top arm and a bottom arm merged together by a front material contacting face portion are all associated with the cooperating tooth element;
    wherein the channel associated with the cooperating holder and the bottom arm of the cooperating tooth element are both cooperatively configured for frictional engagement with one another when the cooperating tooth element is operatively installed onto the cooperating holder.

11. The modular cutting system of claim 10, wherein:
    the spaced apart legs and the channel of the cooperating holder cooperatively receive the bottom arm of the cooperating tooth element by the mating contact between the underside surface of the cross-member and the bottom surface of the tooth element.

12. The modular cutting system of claim 10, wherein:
    the cooperating tooth element further comprises a planar region of the bottom surface configured to engage a channel roof of the cooperating holder.

13. The modular cutting system of claim 10, wherein:
    the cooperating tooth element further comprises a back surface configured to engage a front face of the cooperating holder.

14. The modular cutting system of claim 10, wherein:
    the cooperating tooth element further comprises a roof surface configured to engage a top surface of the cooperating holder.

15. The cooperating frictional engagement between the holder and tooth element of claim 10, wherein:
    the cooperating tooth element further comprises a roof surface configured to engage a top surface of the cooperating holder, a back surface configured to engage a front face of the cooperating holder, a planar region of the bottom surface configured to engage a channel roof of the cooperating holder, and a beveled region of the bottom surface configured to frictionally engage an angled underside surface of the cooperating holder.

16. The modular cutting system of claim 10, wherein the tooth element further comprises:

a supplemental cutting element attached to the front material contacting face.

17. The modular cutting system of claim 16, wherein the supplemental cutting element further comprises:

a pedestal portion and a cap portion extending therefrom.

* * * * *